United States Patent
Azzam

(10) Patent No.: US 7,249,127 B2
(45) Date of Patent: *Jul. 24, 2007

(54) METHOD AND APPARATUS FOR DERIVING LOGICAL RELATIONS FROM LINGUISTIC RELATIONS WITH MULTIPLE RELEVANCE RANKING STRATEGIES FOR INFORMATION RETRIEVAL

(75) Inventor: Saliha Azzam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

This patent is subject to a terminal disclaimer.

(21) Appl. No.: 10/834,303

(22) Filed: Apr. 28, 2004

(65) Prior Publication Data

US 2004/0205079 A1  Oct. 14, 2004

Related U.S. Application Data

(62) Division of application No. 09/865,032, filed on May 24, 2001, now Pat. No. 6,829,605.

(51) Int. Cl.
*G06F 17/30* (2006.01)
(52) U.S. Cl. .............................. 707/4; 707/2; 707/104.1
(58) Field of Classification Search .................... 707/2, 707/4, 102, 104.1
See application file for complete search history.

(56) References Cited

U.S. PATENT DOCUMENTS

| | | | | |
|---|---|---|---|---|
| 5,309,359 A | | 5/1994 | Katz et al. .................. 707/102 |
| 5,438,511 A | | 8/1995 | Maxwell et al. ................ 704/1 |
| 5,515,488 A | * | 5/1996 | Hoppe et al. ................ 345/440 |
| 5,794,050 A | | 8/1998 | Dahlgren et al. ............ 717/144 |
| 5,873,077 A | * | 2/1999 | Kanoh et al. .................. 707/3 |
| 5,893,104 A | | 4/1999 | Srinivasan et al. ......... 707/102 |
| 5,933,822 A | * | 8/1999 | Braden-Harder et al. ...... 707/5 |
| 5,963,940 A | | 10/1999 | Liddy et al. .................... 707/5 |
| 5,966,126 A | | 10/1999 | Szabo ........................ 345/762 |
| 5,987,457 A | | 11/1999 | Ballard .......................... 707/5 |
| 6,076,051 A | * | 6/2000 | Messerly et al. .............. 704/9 |
| 6,161,084 A | * | 12/2000 | Messerly et al. .............. 704/9 |
| 6,205,443 B1 | | 3/2001 | Evans ........................... 707/5 |
| 6,246,977 B1 | | 6/2001 | Messerly et al. .............. 704/9 |
| 6,263,328 B1 | * | 7/2001 | Coden et al. ................... 707/3 |
| 6,393,428 B1 | | 5/2002 | Miller et al. ................ 707/102 |
| 6,553,372 B1 | | 4/2003 | Brassell et al. ................ 707/5 |
| 6,675,159 B1 | | 1/2004 | Lin et al. ....................... 707/3 |

OTHER PUBLICATIONS

U.S. Appl. No. 09/865,032, filed May 24, 2001 and all communications from U.S. Appl. No. 09/865,032, including Office Actions dated: Feb. 17, 2004; Oct. 6, 2003; Response dated: Dec. 8, 2003.

(Continued)

*Primary Examiner*—Leslie Wong
(74) *Attorney, Agent, or Firm*—Theodore M. Magee; Westman, Champlin & Kelly, P.A.

(57) ABSTRACT

A method and apparatus are provided for improving the precision of information retrieval systems that use logical form searching techniques. Under one embodiment of the invention, several logical form triples are produced from the user's query and are combined together by restrictive logical operators to generate a compound logical form query. A search is then performed to find documents that meet the requirements set by the compound logical form query. In other embodiments, results generated by a logical form search are intersected with results from a word search to form a more precise set of results.

14 Claims, 7 Drawing Sheets

OTHER PUBLICATIONS

Y. Alp Aslandogan et al., "Techniques and Systems for Image and Video Retrieval," IEEE TKDE Special Issue3 on Multimedia Retrieval, pp. 1-19 (Jan. 1999).

M. H. Heine et al., "An Investigation of the Optimization of Search Logic for the MEDLINE Database," Journal of the American Society for Information Science, vol. 42, No. 4, pp. 267-278 (May 1991).

D. L. Pape et al., "STATUS With IQ-Escaping From the Boolean Straitjacket," Program, vol. 22, No. 1, pp. 32-43 (Jan. 1988).

G. Salton et al., "Automatic Query Formulations in Information Retrieval," Journal of the American Society for Information Science, vol. 34, No. 4, pp. 262-280 (Jul. 1983).

R. S. Marcus, "Search Aids in a Retrieval Network," Communicating Information. Proceedings of the 43rd ASIS Annual Meeting. vol. 17, pp. 394-396 (Oct. 5-10, 1980).

E. J. Guglielmo et al., "Overview of Natural Language Processing of Captions for Retrieving Multimedia Data," Proceedings of 3rd Conference on Applied Natural Language Processing, pp. 231-232 (Mar. 31-Apr. 3, 1992).

G. Salton, "A Simple Blueprint for Automatic Boolean Query Processing," Information Processing & Management, vol. 24, No. 3, pp. 269-280 (1988).

N. Milic-Frayling et al., "CLARIT Compund Queries and Constraint-Controlled Feedback in TREC-5 Ad-hoc Experiments," Fifth Text Retrieval Confernece (TREC-5), pp. 315-333 (1997). Publisher: Nat. Inst. Standards & Technology.

R. C. Bodner et al., "Knowledge-Based Approaches to Query Expansion in Information Retrieval," Advances in Artificial Intelligence. 11th Biennial Conference of the Canadian Society for Computational Studies of Intelligences, AI'96, pp. 146-158 (1996).

R. Evans, "Beyond Boolean: Relevance Ranking, Natural Language and the New Search Paradigm," Proceedings of National Online Meeting, pp. 121-128 (May 10-12, 1994).

S. Koskiala et al., "Natural Language Access to Free-Text Databases," Information*Knowledge*Evolution, Proceedings of the 44th FID Congress, pp. 153-163 (1988).

D. Elworthy, "Question Answering Using a Large NLP System," Proceedings of the 9th Text Retrieval Conference (TREC-9), NIST Special Publications, pp. 355-360 (Nov. 13-16, 2000).

J. Prager et al., "One Search Engine or Two for Question-Answering," Proceedings of the 9th Text Retrieval Conference (TREC-9), NIST Special Publications, pp. 235-240 (Nov. 13-16, 2000).

E. Voorhees, "The TREC-8 Question Answering Track Report," Proceedings of the 8th Text Retrieval Conference (TREC-8), NIST Special Publication, pp. 77-82 (Nov. 17-19, 1999).

* cited by examiner

METHOD AND APPARATUS FOR DERIVING LOGICAL RELATIONS FROM LINGUISTIC RELATIONS WITH MULTIPLE RELEVANCE RANKING STRATEGIES FOR INFORMATION RETRIEVAL

RELATED CASES

This application is a divisional of U.S. patent application Ser. No. 09/865,032, filed on May 24, 2001 now U.S. Pat. No. 6,829,605 and entitled METHOD AND APPARATUS FOR DERIVING LOGICAL RELATIONS FROM LINGUISTIC RELATIONS WITH MULTIPLE RELEVANCE RANKING STRATEGIES FOR INFORMATION RETRIEVAL.

BACKGROUND OF THE INVENTION

The present invention relates to information retrieval. In particular, the present invention relates to using logical forms in information retrieval.

Information retrieval systems have been developed to help users search through vast collections of documents to find a set of documents that are relevant to a search query. Initial information retrieval systems relied on the search query being in the form of a Boolean expression with keywords of the query linked together by Boolean operators. However, such Boolean expressions are difficult to formulate and require a level of expertise that is beyond most users.

Eventually, information retrieval systems were developed that allowed users to enter queries as natural language statements. In general, there are two types of natural language systems. The first type identifies words in the user's query and searches for these words in a word index. Documents that match these words are ranked and returned based, for example, on the frequency with which the terms appear in the documents.

In a second type of natural language system, semantic parsers are used to identify a semantic structure of both documents and queries, known as a logical form. Logical forms are used to construct an index representing the semantic structure of sentences in the documents of the collection. Documents that match the logical form of the query are returned to the user. An example of such a system is shown in U.S. Pat. No. 5,933,822, issued to the assignee of the present application on Aug. 3, 1999, and entitled "APPARATUS AND METHODS FOR AN INFORMATION RETRIEVAL SYSTEM THAT EMPLOYS NATURAL LANGUAGE PROCESSING OF SEARCH RESULTS TO IMPROVE OVERALL PRECISION."

The performance of information retrieval systems is assessed in terms of recall and precision. Recall measures how well the information retrieval system performs in locating all of the documents in the collection that are relevant. A system that returns all of the documents in a collection has perfect recall. Precision measures the systems ability to select only documents that are relevant. Thus, a system that returns all of the documents in a collection has poor precision because it returns a large number of documents that are irrelevant.

Although retrieval systems that use logical forms generally have improved precision over keyword-based searches, there is an ongoing need for improved precision in information retrieval.

SUMMARY OF THE INVENTION

A method and apparatus are provided for improving the precision of information retrieval systems that use logical form searching techniques. Under one embodiment of the invention, several logical form triples, which represent selected portions of the logical form, are produced from the user's query and are combined together by restrictive logical operators to generate a compound logical form query. A search is then performed to find documents that meet the requirements set by the compound logical form query. In other embodiments, results generated by a logical form search are intersected with results from a word search to form a more precise set of results.

DETAILED DESCRIPTION OF ILLUSTRATIVE EMBODIMENTS

Figure 1:
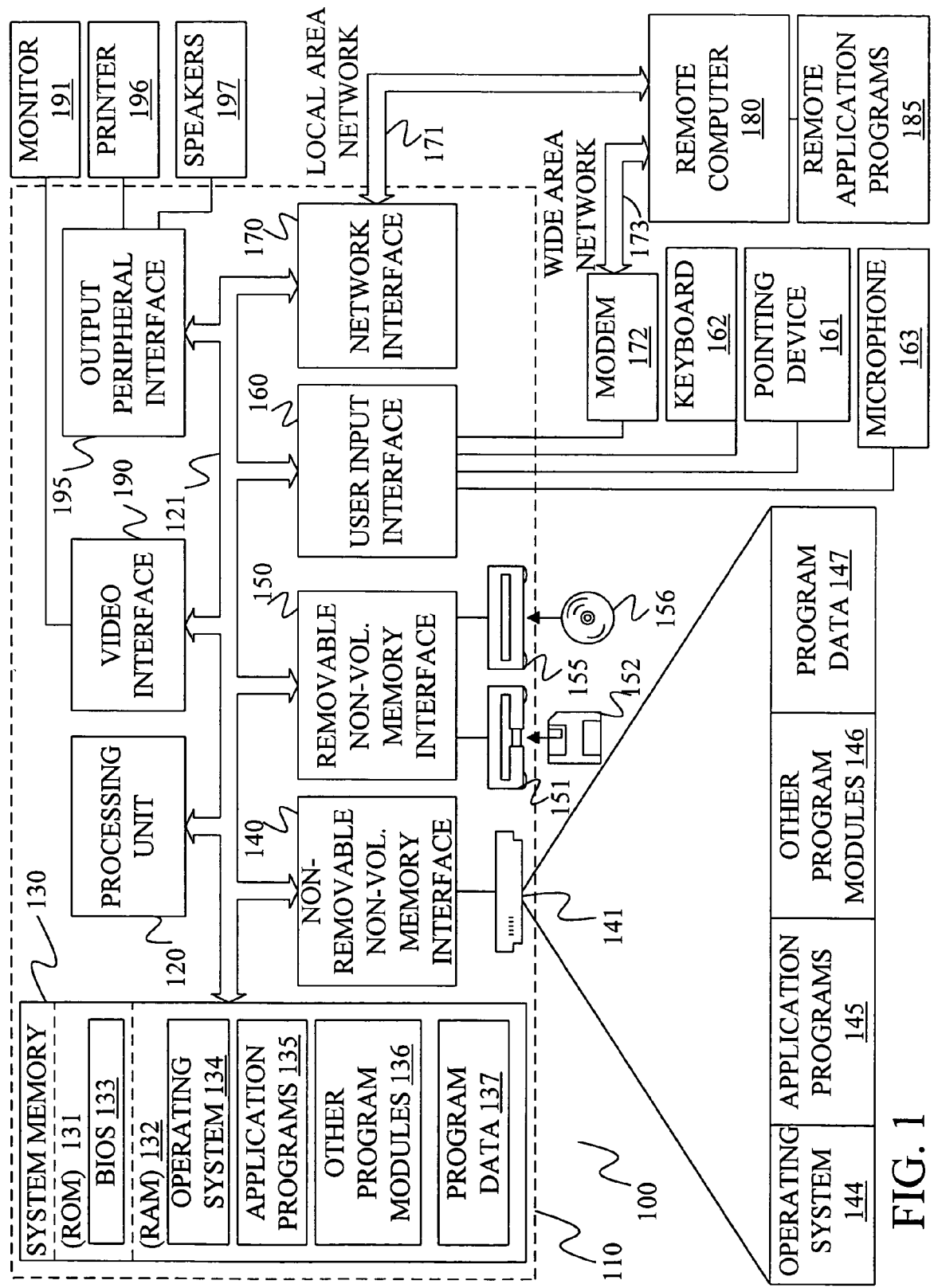
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
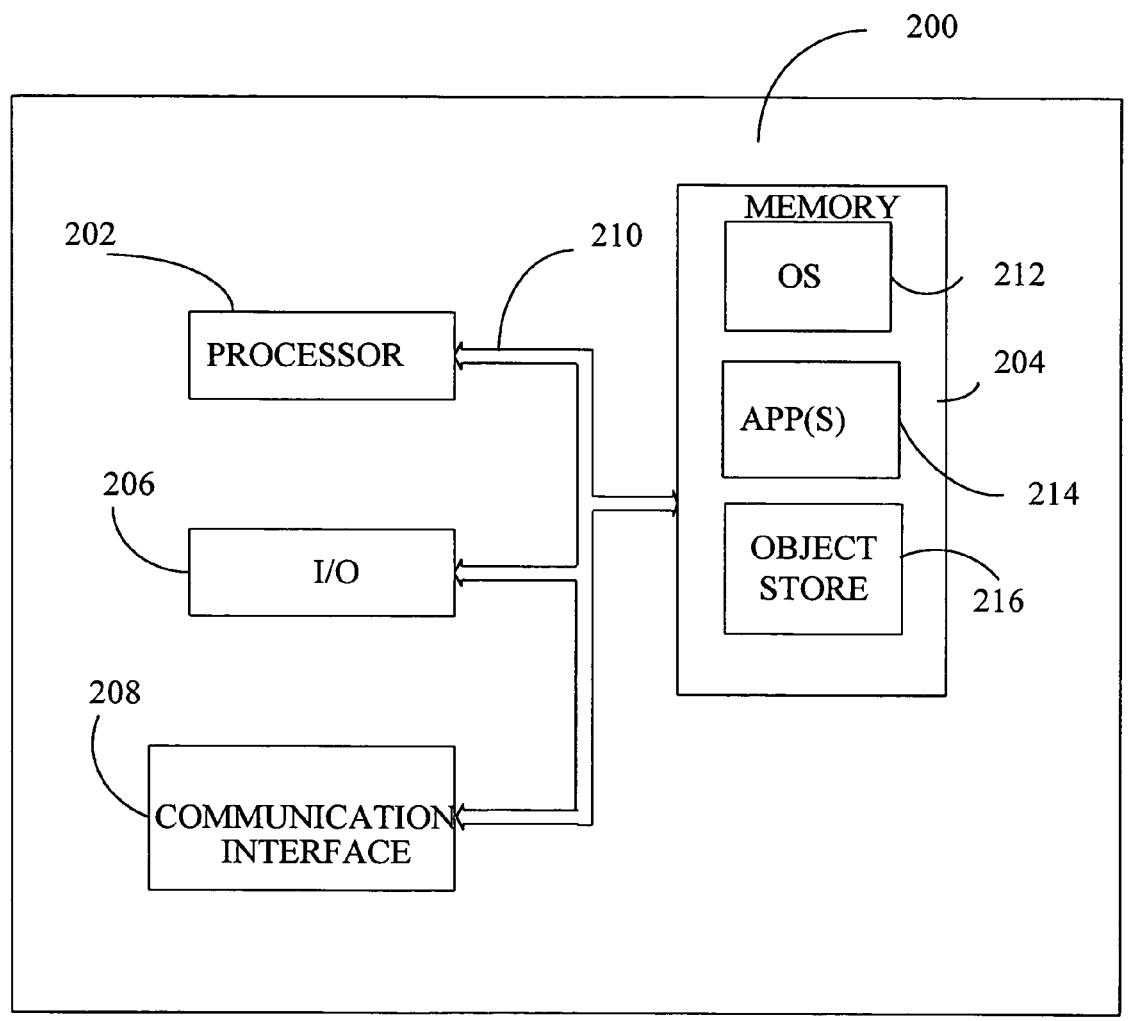
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
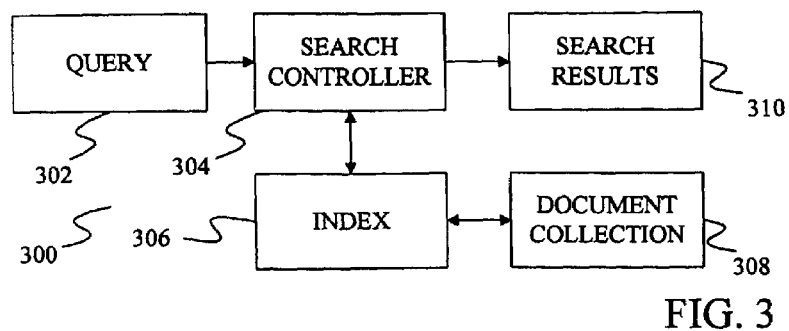
FIG. 3 is a generalized block diagram of an information retrieval system.

FIG. 3 provides a generalized block diagram of an information retrieval (IR) system 300 of the present invention. In IR system 300, a user query 302 is provided to a search controller 304, which searches an index 306 of a document collection 308 to find documents that match the user's query. The techniques of the present invention for identifying these matching documents are discussed further below. A list of the matching documents or portion of the matching documents are returned to the user in a set of results 310.

Under one embodiment of the present invention, search controller 304 creates a compound logical form query (compound LFT query) from the user's search query when the user's query qualifies for the production of such a compound LFT query. The compound LFT query consists of logical form triples connected by restrictive Boolean and/or proximity operators. At least one of the operators requires that two logical form triples appear in the same document in order for the document to be included in the set of results.

Figure 5:
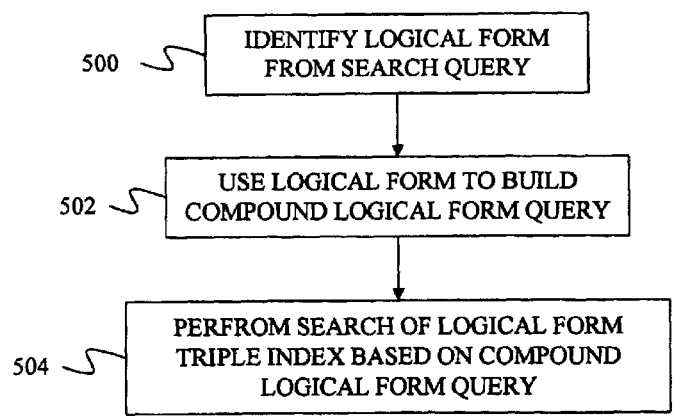
FIG. 5 is a flow diagram of a method for using compound logical form queries.
Figure 4:
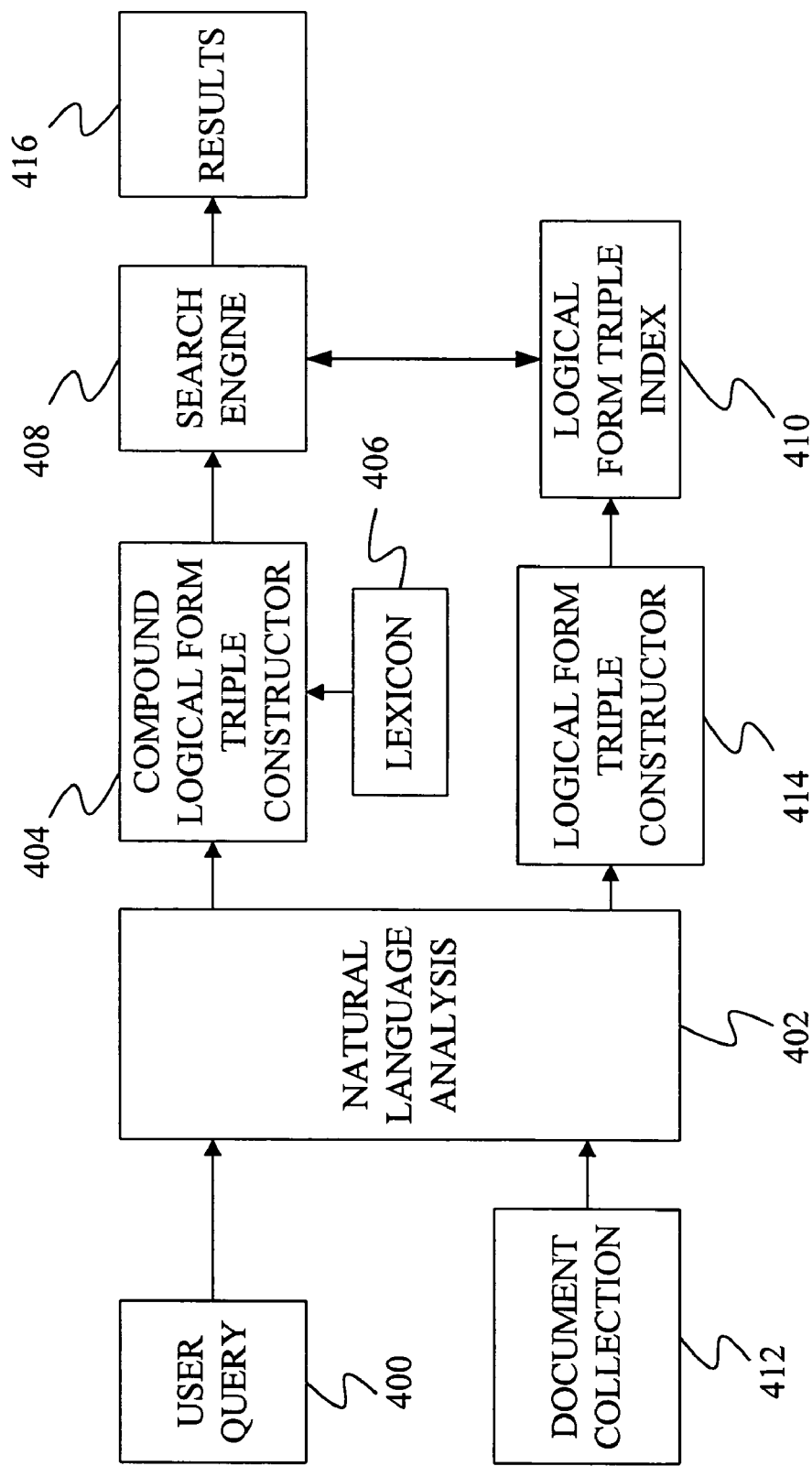
FIG. 4 is a block diagram of an information retrieval system that utilizes compound logical form queries.

FIGS. 4 and 5 provide a block diagram and a flow diagram that describe a technique for formulating and using compound LFT queries from a user query. At step 500 of FIG. 5, a user query 400 is analyzed using natural language analysis 402 to produce a semantic structure such as a logical form. From this logical form structure, compound logical form constructor 404 selects a set of logical form triples, which each represent a sub-graph of the entire logical form structure and are of the form term1-logical_relation-term2. For example, the following triples can be extracted from the logical form of the sentence "Nixon visited China in 1972":

Visit-LogicalSubject-Nixon

Visit-LogicalObject-China

Visit-TmeAt-1972.

Thus, in this example, "Nixon" is the logical subject of the verb "Visit" and "China" is the logical object of the verb "Visit". The "TmeAt" logical relation means "the time at which".

At step 502, compound constructor 404 uses the logical form triples and information in a lexicon 406 to build a compound LFT query. This compound LFT query uses restrictive operators such as AND and NEAR as well as non-restrictive operators such as OR to connect the logical form triples. The decision as to which logical form triples to include and which restrictive operators to use involves many factors which are discussed in detail further below in connection with the flow diagram of FIG. 6.

The compound LFT query formed by constructor 404 is provided to a search engine 408. At step 504, search engine 408 searches through a logical form triple index 410 to identify documents that meet the restrictions of the compound LFT query. In one embodiment, index 410 is an inverted index that indexes logical form triples found in documents in a document collection 412. The triples in the documents are identified by passing each sentence in document collection 412 through natural language analysis 402 to produce a logical form. Each logical form is then passed through a logical form triple constructor 414 to identify a set of logical form triples, which are then stored in index 410.

In one particular embodiment, each logical form triple is stored as a single string in the index so that search engine 408 is able to search a single field when looking for matching logical form triples. The conversion to a single string is performed so that the string is compatible with the rules of the indexing system. For example, if semicolons are not permitted in the indexing system, they must be represented by another character in the single string. Also, if the indexing system uses a keyword stemmer, a suffix character can be added to the end of the string to prevent it from being modified by the stemmer. Note that these details are particular to the indexing system and are not required by all embodiments of the present invention.

Each document that matches the requirements of the compound LFT query is placed in a set of results 416. In alternative embodiments, index 410 indicates a particular paragraph or section of the document that meets the search criteria. In such embodiments, the paragraph or section may be placed in the set of results along with or in place of the citation to the matching document.

Figure 6:
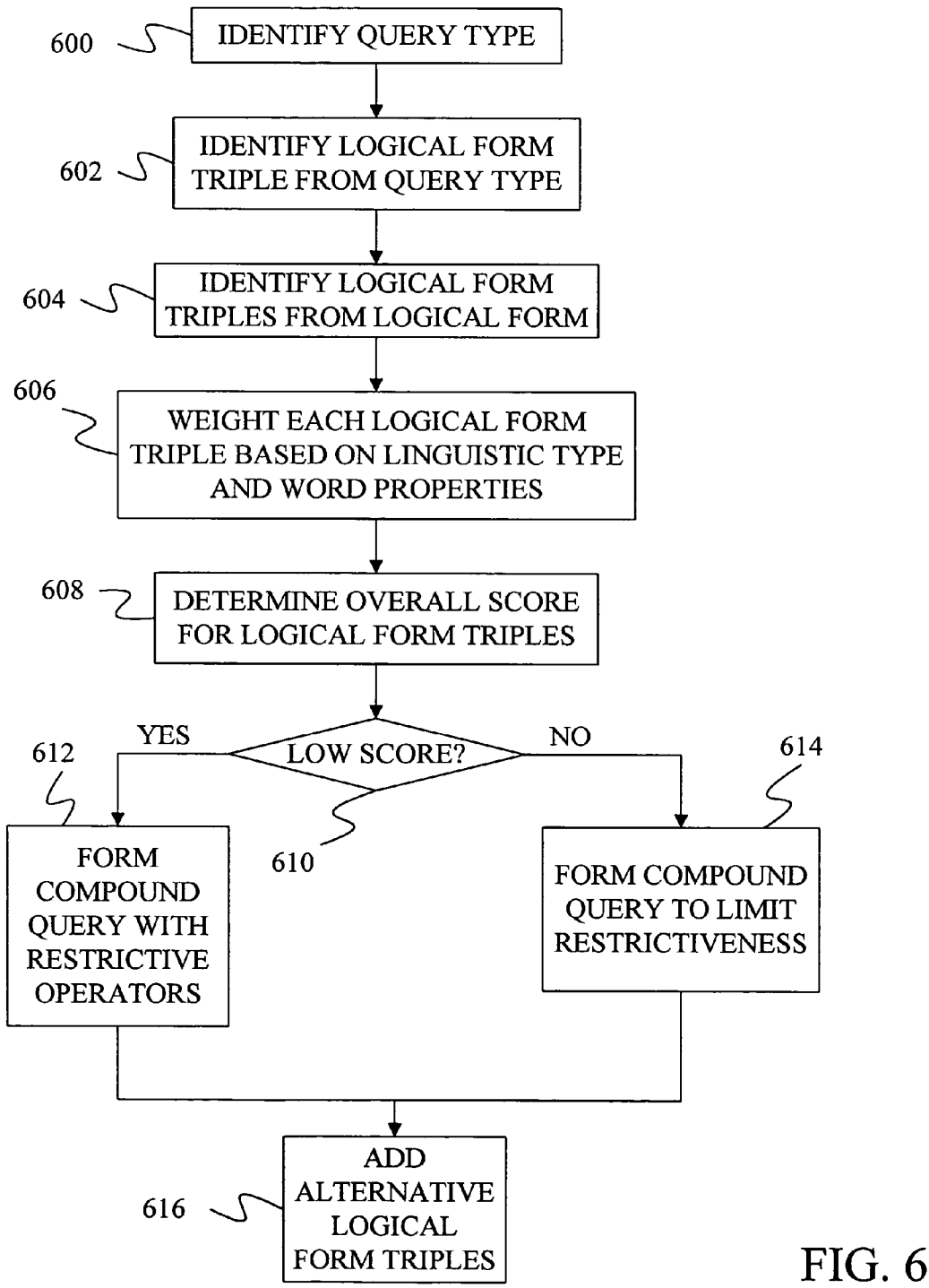
FIG. 6 is a flow diagram of a method of forming compound logical form queries.

FIG. 6 is a flow diagram of the details of step 502 of FIG. 5 showing how compound LFT queries are formed under one embodiment of the present invention.

In step 600 of FIG. 6, the query is examined to determine if it can be categorized into a query type. In particular, the query is examined to see if it contains certain key terms or phrases such as "When", "Where", "How many", or "Who", which are each associated with a separate query type. In general, the query type indicates the type of answer that the user wants in response to their query. For example, a query that includes the keyword "When" indicates that the user wants a date or time to be returned in the search results.

In step 602, if a query type is identified, it is used to generate a logical form triple that explicitly states the semantic type of the query. In particular, the logical form triple can indicate that a particular type of information is being requested such as a DATE, a NUMBER, an AMOUNT, a LOCATION, or a PERSON is being requested.

For example, for the query "When did Nixon visit China?", a logical form triple expressing a DATE relation is created based on the keyword "when". In particular, a triple is formed by linking the date relation "TmeAt" to the verb "visit" found in the query. This results in the logical form triple visit-TmeAt-DATE.

At step 604, additional candidate logical form triples are extracted from the logical form constructed by natural language analysis 402. In most embodiments, the candidate logical form triples should include those that derive from 'strong' linguistic relationships such as 'subject' or 'object.'

At step 606, the identified logical form triples are weighted based on their linguistic type and certain properties of the words linked to the triples. In particular, the logical form triples are weighted based on how restrictive the logical form triple is when applied to the index. In other words, the weighting indicates how likely it is that the triple will return only relevant documents. Triples that are common, and thus would return many non-relevant documents are given low weights while triples that are relatively unique are given high weights. For example, triples with words that have "animate" or "concrete" properties, identified though the lexicon, or triples that include a proper name are given a high weight.

After the weights have been assigned to the logical form triples, the weights are summed to form a total score for the logical form triples at step 608. The total score is compared against a threshold at step 610. If the total score is below the threshold, the logical form triples are not very restrictive and the compound query is formed at step 612 by applying restrictive Boolean operators between each of the logical form triples. This will most often occur when a query type cannot be identified for the query. For example, a query type would not be identified for a query such as "Do birds have tongues?" Because of this, a logical form triple will not be formed based on the query type leaving only the vague triples of:

have-subject-bird
have-object-tongue

Linking these triples with a default OR will match all documents containing information on any animals having tongues (e.g. cats have tongues, dogs have tongues, etc.) as well as on document sentences containing phrases such as "birds have wings, birds have beaks, etc. Thus, a more restrictive operator is selected when the overall score for the triples is low.

In most embodiments, the restrictive operators include the Boolean operator AND, which requires two logical form triples to appear in the same document, and the proximity operator NEAR, which requires that the logical form triples appear within some distance of each other within a document. Because the NEAR operator has more requirements for the logical form triples, it is more restrictive than the AND operator. In many embodiments, the distance associated with NEAR can be set to provide better control of how restrictive the compound LFT query is.

Because the NEAR operator is more restrictive than the AND operator, a decision must be made as to which restrictive operator to apply between the logical form triples. Under one embodiment, the restrictive operators are selected based on the frequency levels of the logical form triples in the document collection. For example, if two logical form triples both have high frequency levels in the document collection, they are connected by the more restrictive NEAR operator. If one or both of the logic form triples does not appear frequently in the document collection, some embodiments of the present invention apply the less restrictive AND operator to the triples. Note that in one embodiment, the frequencies of the triples are calculated when index 410 is formed.

In some embodiments of the present invention, the frequencies of some triples do not have to be determined because it can be assumed that these triples appear frequently in the document collection. For example, the nominal adjective (NAdj) triple "average-Nadj-temperature", such as in the query "What is the average temperature in Seattle?", is not very discriminative because it will match with any document that includes the phrase average temperature. As such, its frequency does not have to be examined. Instead, a rule can be associated with all nominal adjective triples to require that the triple be combined with another triple using a restrictive operator. The relative 'weakness' of the triple relation can be used to set the type of restrictive operator, AND or NEAR, to be used.

In other embodiments, high frequency triples or weak triple relations cause a rule to execute that identifies additional logical form triples from the logical form. For example, for the weak triple "temperature-Nadj-average", an additional triple such as "temperature-LocAt-Seattle" is derived from the logical form to create a compound LFT query of "(temperature-Nadj-average AND temperature-LocAt-Seattle)."

If the total score for the logical form triples is higher than the threshold at step 610, the compound query is built at step 614 so that the query is not too restrictive. This can be done by modifying one or more triples to allow for fuzzy matching, using a nonrestrictive operator such as OR between some of the triples, and/or eliminating some of the triples from the compound LFT query.

For example, the query "When did the USSR explore Venus?" would produce logical form triples that would have a combined score that exceeded the threshold because two of the triples "explore-object-Venus" and "explore-subject-USSR" include proper names. Because of this, applying restrictive operators between each of the logical form triples, thereby forming a compound LFT query such as (explore-object-Venus AND explore-subject-USSR AND explore-TmeAt-DATE), would produce an overly restrictive query that would be unlikely to return enough relevant documents. To prevent this, step 614 constructs the compound LFT query so that it is less restrictive. For example, the logical form triple "explore-TmeAt-Date" can be changed to "*-TmeAt-Date" to allow for fuzzy matching on the triple. Alternatively, the "TmeAt" triple could be removed from the compound LFT query or could be connected to the remaining triples by the non-restrictive operator OR.

After step 612 or step 614, the compound query formation continues at step 616 where alternatives to some of the logical form triples are added to the compound query. For example, using a synonym expansion for the word "visit", the compound query (Visit-subject-Nixon AND Visit-object-China AND Visit-TmeAt-Date) can be expanded to ((Visit-subject-Nixon OR travel_to-subject-Nixon) AND (Visit-object-China OR travel_to-object-China) AND (Visit-TmeAt-Date OR travel_to-TmeAt-Date). Note that the alternative expressions are linked with the non-restrictive OR operator.

Note that not all user queries can be used to form a compound LFT query. For instance the user query "What is an x-ray?" does not provide enough information to permit the formation of a compound LFT query.

Figure 7:
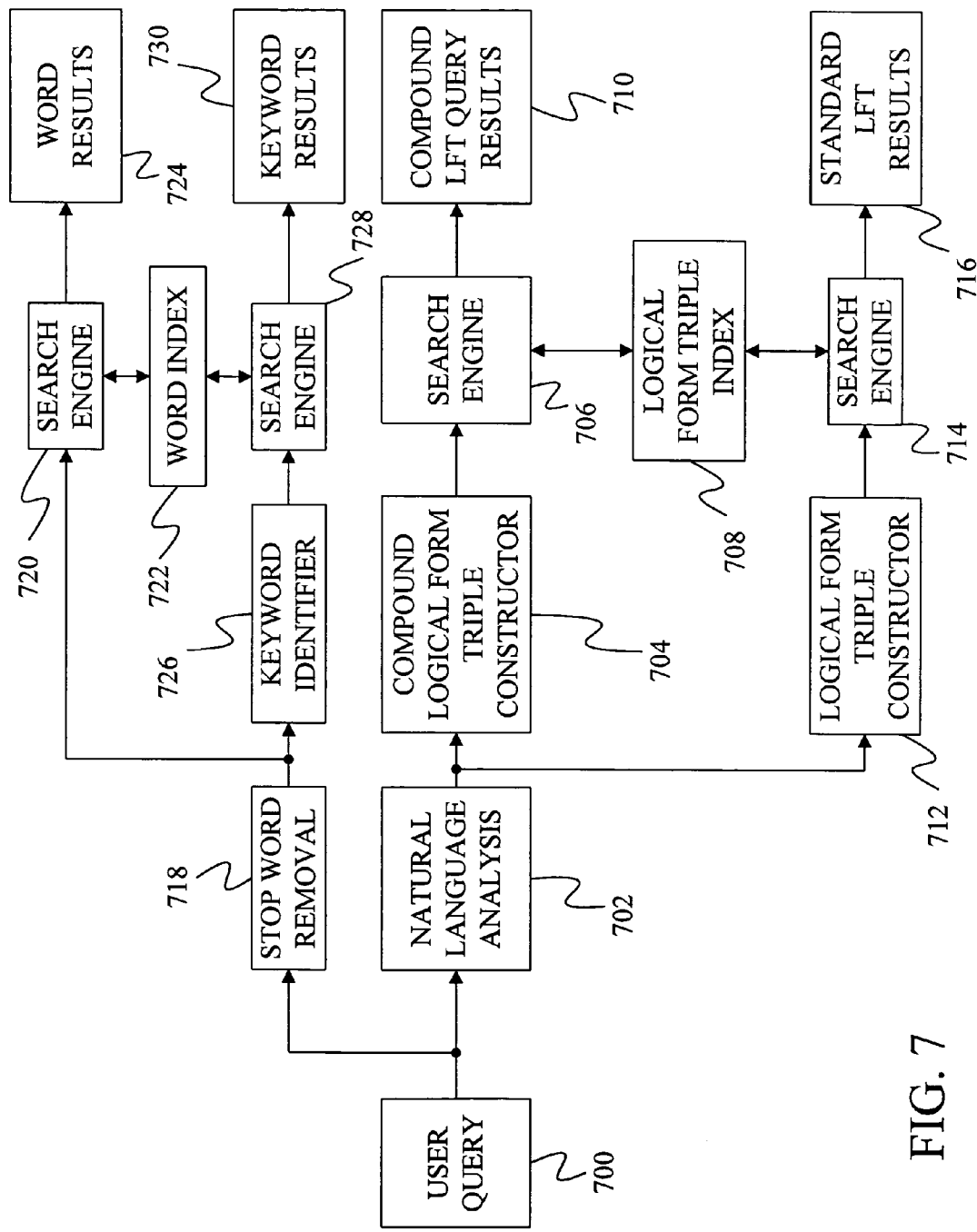
FIG. 7 is a block diagram of an information retrieval system that forms both logical form search results and word-based search results.

Under one embodiment of the invention, the results formed from the compound LFT query are used in a technique that intersects results from logical form triple searches with results from individual word searches. FIG. 7 shows one particular embodiment, wherein the compound LFT query results are one of four sets of results formed from a user query 700.

In FIG. 7, user query 700 is converted into a logical form by logical form analysis 702. As in FIG. 4, the logical form is used by a compound LFT query constructor 704 to form a compound LFT query. The compound query is used by search engine 706 to search logical form triple index 708 and thereby form compound LFT query results 710.

The logical form produced by natural language analysis 702 is also provided to a logical form triple constructor 712, which identifies all of the possible logical form triples in the logical form. These triples are used by a search engine 714 to perform a standard logical form triple search. In this standard LFT search, a nonrestrictive OR operator is placed between each logical form triple so that all documents in index 708 that contain at least one of the logical form triples are found. This search produces a set of standard LFT results 716.

User query 700 is also provided to a stop word removal unit 718, which removes very common words such as "the", "a", "is", "to", etc. The remaining words are provided to a search engine 720, which searches for each of the words in a word index 722. Typically, word index 722 is an inverted index in which each word in the index points to the documents in the document collection that contain the word. The results of this simple word search appear as word results 724 in FIG. 7.

The words produced by stop word removal unit 718 are also provided to an important word identifier 726, which searches the words for important words such as proper names, cities, countries, etc., by consulting entries in the lexicon. The words identified by important word identifier 726 are provided to a search engine 728, which searches word index 722 for the important words to produce a set of important word results 730.

Under one embodiment of the invention, the portions of search engines 706, 714, 728, and 720 that actually search the word index and the logical form triple index are the same. In particular, these search components search a single field in the index to determine if a document contains a particular logical form triple or a particular word.

Under one embodiment of the invention, a set of logical form search results, such as standard LFT results 716 or compound LFT query results 710, are intersected with a set of word-based search results, such a word results 724 or important word results 730, to form a more precise final set of results. Thus, the precision of the logical form search is improved by intersecting it with a word-based search.

Figure 8:
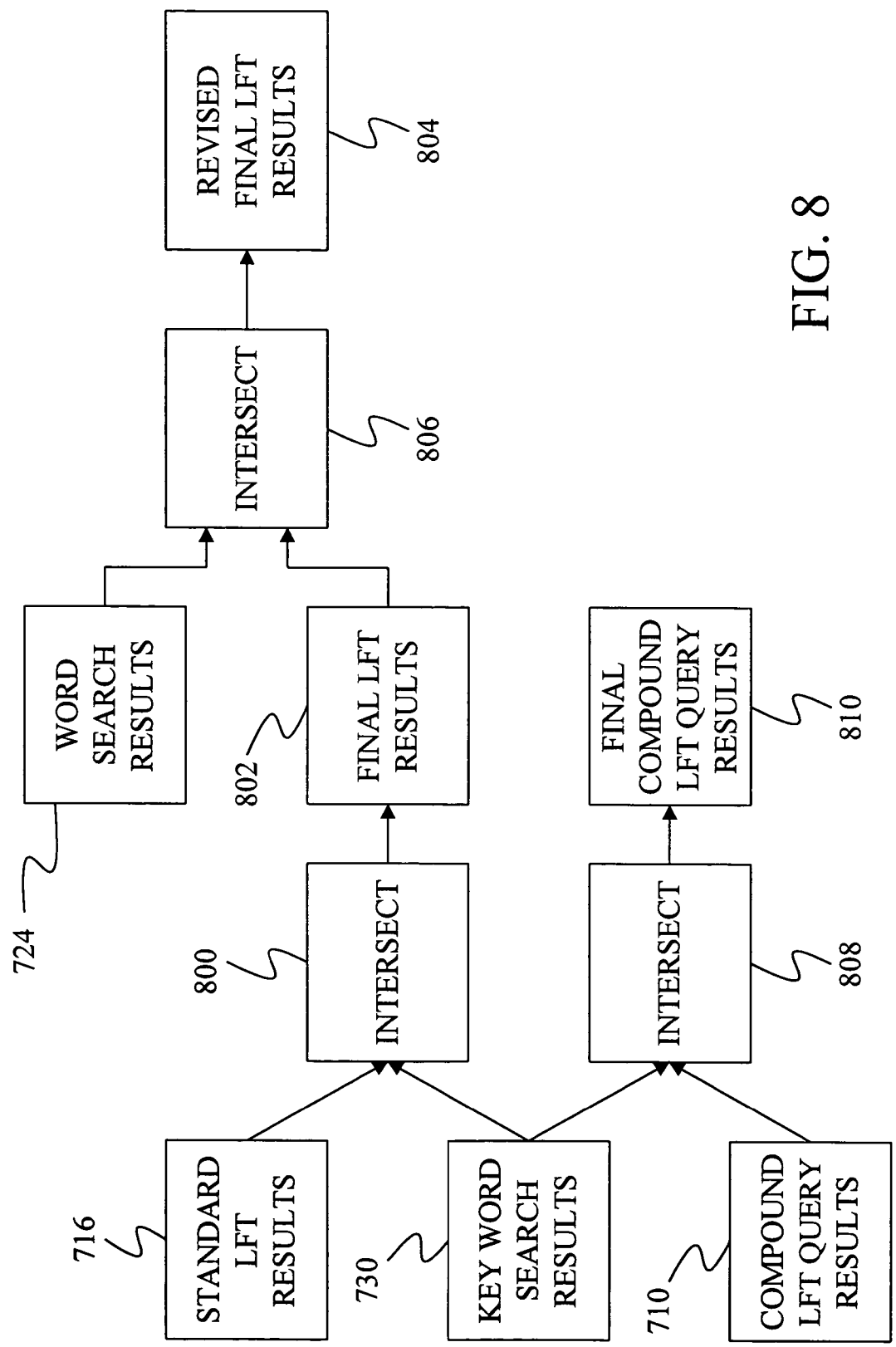
FIG. 8 is a block diagram showing the intersection of logical form search results and word-based search results.

FIG. 8 shows a block diagram of how results can be intersected to form more precise filtered results under embodiments of the present invention. Note that the intersections shown in FIG. 8 are only examples and that other intersections between logical form searches and word searches are possible under the present invention.

In FIG. 8, standard LFT results 716 of FIG. 7 are intersected with keyword results 730 by an intersection unit 800 to form a set of filtered standard LFT results 802. This intersection involves selecting only those documents that appear in both standard LFT results 716 and keyword results 730. Under one embodiment, the top five documents in standard LFT query results 716 are intersected with important word results 730.

Filtered standard LFT results 800 can be further refined by intersecting them with the top n documents in word results 724, where n is typically between five and ten (we call "n" ranking parameter). This results in further filtered standard LFT results 804, which are produced by intersection unit 806.

As shown in FIG. 8, important word results 730 can also be intersected with the documents in compound LFT query results 710 by an intersection unit 808 to form filtered compound LFT results 810.

Under one embodiment, filtered standard LFT results 802, further filtered standard LFT results 804 and filtered compound LFT results 810 are all returned to the user in an ordered list. Specifically, filtered compound LFT results 810 are placed at the top of the list followed by further filtered standard LFT results 804 and then filtered standard LFT results 802. Note that redundant documents are removed from further filtered standard LFT results 804 and filtered standard LFT results 802 before those results are added to the list.

Although the present invention has been described with reference to particular embodiments, workers skilled in the art will recognize that changes may be made in form and detail without departing from the spirit and scope of the invention.

What is claimed is:

1. A method for retrieving information from a document collection, the method comprising:
    converting a user query into at least two logical form triples;
    generating a compound logical form query by connecting at least two of the logical form triples with a restrictive operator wherein generating compound logical form query comprises:
        determining a score for each logical form triple;
        combining the scores for each logical form triple to form a total score; and
        generating the compound logical form query based in art on the total score; and
    searching an index of the document collection for documents that match the compound logical form query.

2. The method of claim 1 wherein searching an index comprises searching a field in the index that contains entire logical form triples.

3. The method of claim 1 wherein converting a user query comprises identifying a query type from the user query and generating a logical form triple based on the query type.

4. The method of claim 1 wherein determining a score for each logical form triple comprises determining a score based on properties of words associated with a logical form triple.

5. The method of claim 1 wherein determining a score for a logical form triple comprises determining a score based on a linguistic type associated with the logical form triple.

6. The method of claim 1 wherein generating the compound logical form query based in part on the total score comprises:
   determining that the total score is relatively low; and
   based on the relatively low total score, using restrictive operators between each logical form triple in the compound logical form query.

7. The method of claim 1 wherein generating the compound logical form query based in part on the total score comprises:
   determining that the total score is relatively high; and
   based on the relatively high total score, constructing the compound logical form query to allow fuzzy matching of at least one logical form triple.

8. The method of claim 1 wherein generating the compound logical form query based in part on the total score comprises:
   determining that the total score is relatively high; and
      based on the relatively high total score, placing a non-restrictive operator between at least two logical form triples in the compound logical form query.

9. The method of claim 1 wherein generating the compound logical form query based in part on the total score comprises:
   determining that the total score is relatively high; and
   based on the relatively high total score, constructing the compound logical form query using only some of the logical form triples formed from the user query.

10. The method of claim 1 wherein searching the index produces a set of logical-based search results and wherein the method of retrieving information further comprises:
   searching a word index of the document collection for documents that match words in the user query to produce a set of word-based search results; and
   intersecting the logical-based search results with the word-based search results to form a filtered set of search results.

11. A method of retrieving information from a document collection, the method comprising:
   generating a compound logical form query from a user query, the compound logical form query having at least two logical form triples connected by a restrictive operator, wherein generating a compound logical form query comprises:
      determining the restrictiveness of a set of logical form triples identified from the user query by weighting each individual logical form triple in the set of logical form triples; and
      combining logical form triples based on the weightings of the logical form triples to form the compound logical form query so as to limit the restrictiveness of the compound logical form query formed from the set of logical form triples;
   applying the compound logical form query to a logical form triple index of a document collection to form a set of logic-based search results;
   generating a word query based on words in the user query;
   applying the word query to a word index of the document collection to form a set of word-based search results; and
   intersecting the logic-based search results with the word-based search results to form a set of filtered compound results.

12. The method of claim 11 wherein generating a word query comprises identifying important words in the user query and placing the important words in the word query.

13. A computer-readable storage medium having computer-executable instructions for performing information retrieval steps comprising:
   performing a logic-based search of a document collection using logical form triples created from a user query to create logic-based search results, performing the logic-based search comprising forming a compound logical form query by identifying at least two logical form triples from the user query, weighting each of the logical form triples with weights, summing the weights to form a score and connecting at least two of the logical form triples with a restrictive operator based on the score, and using the compound logical form query to search the document collection;
   performing a word-based search of the document collection using words taken from the user query to create word-based search results; and
   intersecting the logic-based search results and the word-based search results to form filtered search results.

14. The computer-readable storage medium of claim 13 wherein performing a word-based search comprises identifying important words in the user query and using only the important words in the word-based search.

\* \* \* \* \*